United States Patent [19]

Maier

[11] Patent Number: 5,062,763
[45] Date of Patent: Nov. 5, 1991

[54] STACKER, ESPECIALLY FOR AN OFFSET PLATE TRANSPORTER

[75] Inventor: Willy Maier, Kloten, Switzerland

[73] Assignee: Daverio AG, Zurich, Switzerland

[21] Appl. No.: 545,275

[22] Filed: Jun. 28, 1990

[30] Foreign Application Priority Data

Aug. 9, 1989 [CH] Switzerland .................. 2930/89

[51] Int. Cl.$^5$ .................................. B65G 1/133
[52] U.S. Cl. ............................ 414/787; 414/331
[58] Field of Search ............ 414/331, 787, 277, 278, 414/268, 269; 198/485.1, 486.1, 487.1

[56] References Cited

U.S. PATENT DOCUMENTS

| 2,831,213 | 4/1958 | Klarmann et al. | 414/277 X |
| 2,866,566 | 12/1958 | Péras | 414/277 |
| 4,285,623 | 8/1981 | Stephens | 414/278 |
| 4,801,236 | 1/1989 | Katzenschwanz | 414/787 X |
| 4,806,059 | 2/1989 | Gössl et al. | 414/331 |
| 4,874,077 | 10/1989 | Yaguchi et al. | 198/486.1 X |
| 4,875,570 | 10/1989 | Kyoo | 198/485.1 X |
| 4,886,410 | 12/1989 | Lisec | 198/487.1 X |
| 4,887,953 | 12/1989 | Greub | 414/331 |
| 4,890,718 | 1/1990 | Colamussi | 414/331 X |

FOREIGN PATENT DOCUMENTS

| 351356 | 1/1990 | European Pat. Off. . | |
| 186808 | 10/1984 | Japan | 414/331 |
| 18606 | 1/1986 | Japan | 414/277 |
| 127502 | 6/1986 | Japan | 414/277 |
| 155108 | 7/1986 | Japan | 414/277 |
| 1172840 | 8/1985 | U.S.S.R. | 414/331 |

Primary Examiner—David A. Bucci
Attorney, Agent, or Firm—Weiser & Stapler

[57] ABSTRACT

A stacker preferably includes two units, each having three storage drums which are arranged one above the other and which can be rotated independently of each other, and a feed device for carrying printing plates to the storage drums and arranged between the units. Further arranged between the storage drums is a drum loader for receiving printing plates from the feed device and for inserting the received plates into empty storage cells of the drums. The drums can be rotated independently of one another in a clockwise or a counterclockwise direction, for insertion or removal of the printing plates, which may be offset plates or other printing plates which must be handled very carefully.

11 Claims, 2 Drawing Sheets

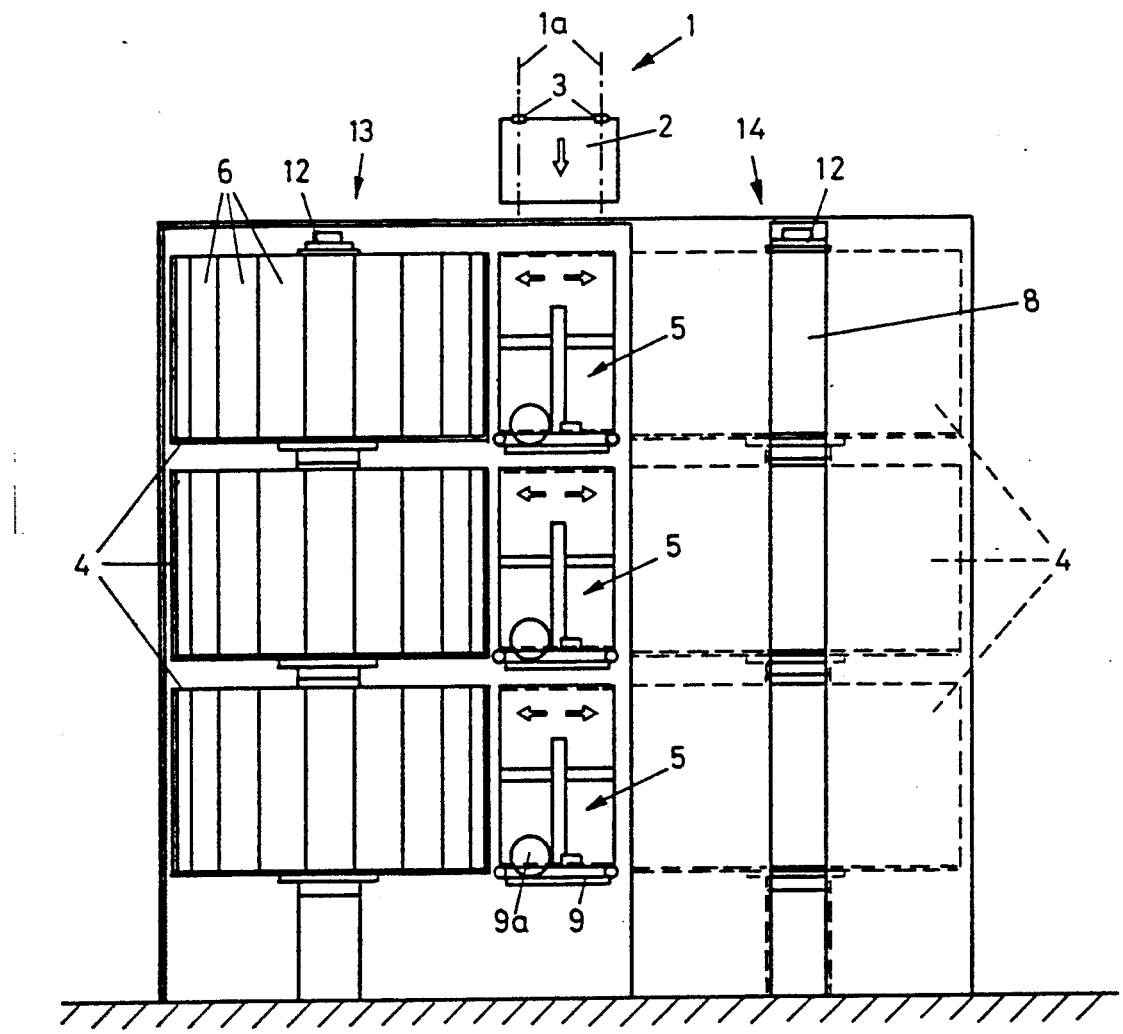
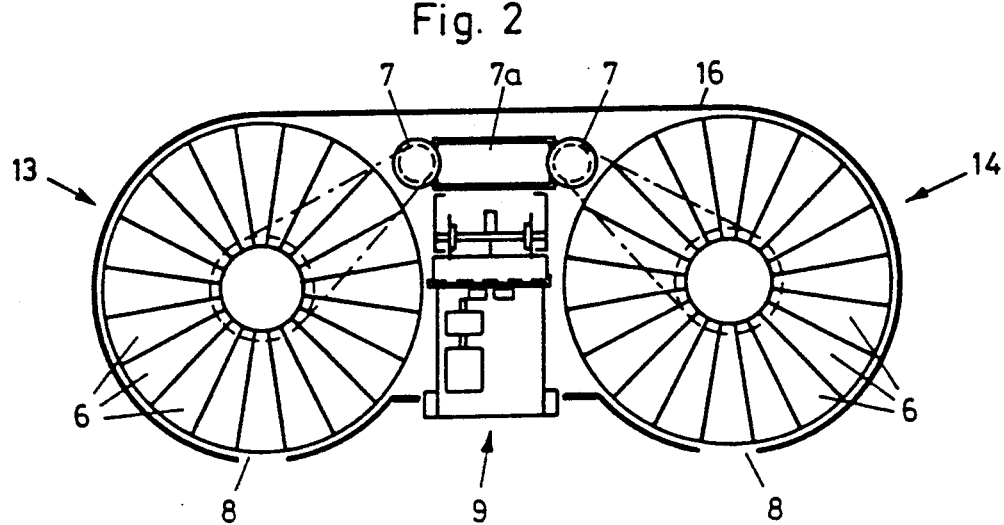
Fig. 2

STACKER, ESPECIALLY FOR AN OFFSET PLATE TRANSPORTER

BACKGROUND OF THE INVENTION

The present invention generally pertains to a stacker which is especially useful in conjunction with an offset plate transporter or the like.

Stackers of this general type are known, for example, with reference to European Patent Application EP 89 810 439.3. Disclosed is a stacker in which printing plates are moved vertically downwardly from above, for insertion into compartments which are open from above. This stacker is especially suitable for receiving flexible printing plates, but is somewhat less suitable for receiving rigid offset plates. What is more, a stacker which makes it possible to stack an increased number of printing plates in the same limited space which is available would also be desirable.

SUMMARY OF THE INVENTION

It is therefore the primary object of the present invention to provide a stacker of the type mentioned above which is especially suited to stacking rigid printing plates, and in particular, rigid offset plates.

It is also an object of the present invention to provide a stacker of this general type which further has an increased stacking density.

It is also an object of the present invention to provide a stacker of this general type which is also simple in operation.

These and other objects are achieved in accordance with the present invention by providing a stacker which is especially suitable for use with an offset plate transporter or the like and which generally includes a feed device which individually feeds the plates to one or more storage units (preferably one or more rotatable storage drums having open cells for receiving the plates), and at least one loader which operates to receive the plates from the feed device for insertion into an available storage unit.

The present invention is preferably employed in conjunction with storage drums which are rotatable about a horizontal axis to permit a simple, yet very careful insertion of the printing plates into their assigned cells. In so doing, the printing plates are not bent, but rather are inserted into the cells by vertically and horizontally rectilinear movements. A desired number of cells can be developed by proper selection of the drum diameter, and the number of drums used.

An especially simple and space-saving arrangement is obtained when, further in accordance with the present invention, several storage drums are arranged one above the other. An especially rapid feeding of the printing plates to the storage drums is obtained if two such units (with several drums) are arranged next to one another. In either case, with a minimum of movement, an empty cell can be guided into a position suitable for loading by rotating the appropriate drum. As a rule, unloading is at the same time made possible for the other storage drums which are provided.

Radial insertion of the printing plates into cells of the storage drum can take place in a mechanically straightforward manner by providing a feed element which operates to insert the plates into the storage drums with a horizontal movement which is generally radial with respect to the drum. To this end, a suitable support is provided which serves to hold the printing plates vertically, or preferably at a slight incline, on the feed element Further in accordance with the present invention, an especially careful placement of the plates onto the drum loader (the feed element) is permitted using a slide which operates to pivot each printing plate about its upper edge, so that the lower edge of the plate is rotated toward the feed element with a vertical movement as the printing plate is suspended from its upper edge. Upon further movement of the slide, the upper edge of the printing plate is pivoted about the lower edge so that the printing plate comes to lie against the cooperating support (for further handling).

For further detail regarding a stacker produced in accordance with the present invention, reference is made to the detailed description which is provided below, taken in conjunction with the following illustrations.

BRIEF DESCRIPTION OF THE DRAWINGS

FIG. 1 is a schematic, side view of a stacker produced in accordance with the present invention which has two storage units, each of which includes three storage drums.

FIG. 2 is a top view of the stacker of FIG. 1.

In the several views provided, like reference numbers denote similar structures.

DETAILED DESCRIPTION OF THE PREFERRED EMBODIMENT

Figure 3:
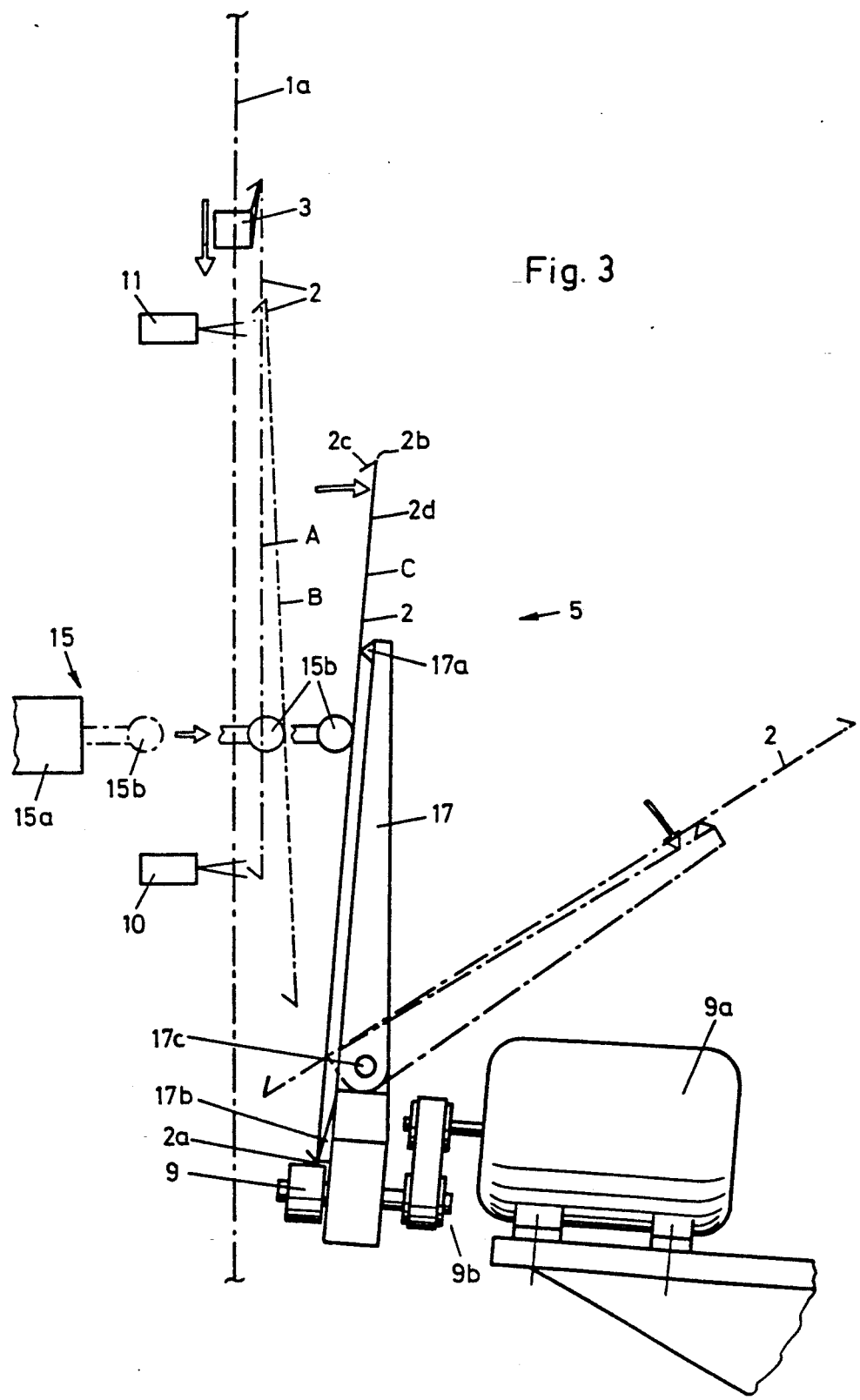
FIG. 3 is a schematic representation of the drum loader.

The sorter which is schematically shown in FIGS. 1 and 2 generally comprises two storage units 13 and 14, each of which includes three storage drums 4 arranged one above the other and which are rotatably mounted to a support 12. A drive 7 and a control device 7a are positioned between the units 13 and 14, and operate to control rotational movements of the storage drums. Preferably, the storage drums can be rotated separately, and independent of the other storage drums. Drives and controls of this type are generally known to the person of ordinary skill, and therefore need not be described in further detail. To be noted is that sorting units which have more than three storage drums located above one another, or fewer than three storage drums, are also possible.

Additionally positioned between the units 13 and 14 is a feed device 1 for moving offset plates 2 downwardly between the units 13 and 14, from above. The feed device 1 comprises two parallel and flexible feed chains 1a to which suspension clips 3 are attached, preferably at equal distances. The printing plates 2 incorporate rear angle brackets 2c on their upper edges 2b (shown in FIG. 3) for engagement by paired suspension clips 3 associated with the feed chains 1a.

In operation, the printing plates 2 are caused to pass through a series of drum loaders 5 located adjacent to the storage drums 4, or are directly inserted into the storage cells 6 of a storage drum 4 by a drum loader 5. In either case, as shown in FIG. 3, each such drum loader 5 includes a band-shaped feed element 9 which can be moved by a motor 9a through a gear drive 9b, alternatively in one direction or the other. This operates to cause longitudinal movement of a received (supported) plate 2 toward or away from the storage cell 6 of a storage drum 4 (into or out of the page as viewed in the figure), for loading purposes.

If a plate 2 is to pass the drum loader 5, it is not influenced while adjacent to the drum loader 5 but rather is moved vertically downwardly, suspended from the feed device 1 as shown in FIG. 3 (position A). However, if a printing plate 2 is to be inserted into a storage cell 6 by the drum loader 5, steps are taken to detect the lower edge 2a of the printing plate 2, preferably using an optical sensor 10 which is arranged below a cooperating slide 15. As soon as the lower edge 2a is located at the level of the optical sensor 10, the slide 15 is operated to extend an arm 15b from a pressure cylinder 15a and into contact with the printing plate 2, pivoting the printing plate 2 from the position A to the position B shown in FIG. 3. In such case, the speed of the feed device 1 preferably is not reduced.

As the printing plate 2 is moved further downwardly, the arm 15b will continue to slide along the plate 2, causing the lower edge 2a of the plate 2 to pivot into position above (and onto) the feed element 9, while suspended from the clips 3. Further movement of the arm 15b then operates to pivot the printing plate 2 about its lower edge 2a, while at the same time lifting the upper edge 2b from the suspension clips 3. This operates to place the printing plate 2 onto a support 17, which is preferably inclined with respect to the feed chains 1a. In this position (position C of FIG. 3), the printing plate 2 is caused to assume an inclined position corresponding to that of the support 17, preferably coming to rest with its front face (below and above) against rubber/elastic punctiform bodies 17a and 17b.

The plate 2 can, if desired, be removed manually by pivoting the support 17 (backwards) about the axis 17c into the position which is shown in phantom in FIG. 3. However, as is preferred, the printing plate will generally come to be inserted into an empty storage cell 6 of a storage drum 4 by the feed element 9. To this end, one of the storage drums 4 adjacent to the drum loader 5 (and the printing plate 2) is rotated until an empty storage cell 6 is arranged next to the printing plate 2 (as shown in FIG. 2). As a rule, an empty storage cell will already be in position when the plate 2 is placed on the feed element 9. Of course, a printing plate will only be placed onto a drum loader 5 when there are empty storage cells 6 available.

Referring again to FIG. 2, the printing plate 2 is then horizontally inserted into the available storage cell by the feed element 9, either to the left or to the right. Preferably, the storage cells 6 incorporate means for preventing the printing plates which have been inserted into them from being able to fall from the storage cells, for example, due to vibrations or bouncing. It is important that when inserting a plate 2 into a storage cell 6, the feed device should not be stopped or decelerated. Therefore, it is possible, and indeed preferable, to insert several printing plates 2 into available storage cells 6 at the same time.

As a rule, the printing plates 2 are manually removed from the storage drums 4. For this purpose, the housing 16 for the unit includes an unloading slot 8 for each storage unit 13 or 14. The (numbered and recorded) printing plates 2 can be brought into desired position by controlled rotation of the corresponding storage drum 4. In this position, the desired plate can be removed through the unloading slot 8.

The drums 4 will generally comprise, as an example, thirty-two storage cells 6, and can be moved independently in a clockwise or a counterclockwise direction. This arrangement allows for fast loading and unloading of the storage cells, with minimum movement. As a rule, the upper two storage drums are completely filled before the lower storage drums 4 are loaded, which corresponds to the principle that the nearest empty storage cell 6 should be accessed.

As previously mentioned, more than three storage drums can be arranged one above the other. A simple implementation with only one storage drum and one drum loader 5 is also possible. The number of storage cells 6 per storage drum 4 can also be increased or reduced (by a larger or smaller radius for the storage drum 4), if desired. Thus, with the stacker of the present invention, customer requirements for the number of storage cells, as well as for the width or height of the stacker, can be accommodated without the need for fundamental structural changes. Despite these advantages, the stacker of the present invention can be produced with relatively few, simple and sturdy components. Thus, a sorter can be designed which provides for necessary mechanical handling requirements, including a careful handling of offset plates, yet which nevertheless can be produced cost-effectively.

Also possible is an embodiment in which only one drum 4 is provided, and in which the plates 2 are inserted not radially, but axially into the corresponding cells 6 (open from above). In this embodiment (which tends to have a somewhat smaller storage capacity), the plates 2 are inserted into the cells 6 from above. The drum loader 5 can be omitted in such case.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. A stacker suitable for use with an offset plate transporter, comprising:
    a feed device for individually feeding plates to at least one storage unit, wherein the storage unit includes a rotatable storage drum having cells which are open along the circumference of the storage drum, and at least one drum loader for receiving the plates from the feed device and for inserting the plates into the cells of the storage drum;
    wherein the drum loader has a stationary feed element for receiving a plate and for inserting the plate into an open cell of the storage unit, the feed device includes means for moving the plates vertically downwardly onto the feed element, the feed element includes a support for receiving a plate stopped and resting on the feed element, and the drum loader further includes means for transferring a plate from the feed device to the feed element, including means for moving the plate into position above the feed element so that the plate is stopped and removable from the feed device and comes to rest on the feed element.

2. The stacker of claim 1 wherein a plurality of storage drums are arranged one above the other, and wherein a drum loader is associated with each storage drum for radially inserting plates into the cells of the storage drum.

3. The stacker of claim 2 wherein the plurality of storage drums are rotatable independent of one another.

4. The stacker of claim 2 which includes two units comprised of plural storage drums arranged one above the other, and wherein the drum loader is arranged between the two units so that plates can be fed alternatively to one or the other of said units.

5. The stacker of claim 1 wherein the support is slightly inclined.

6. The stacker of claim 1 wherein the support is pivoted for removal of the plates.

7. The stacker of claim 1 wherein said moving means includes a slide for pivoting a lower edge of the plate into said position above the feed element.

8. The stacker of claim 7 wherein the slide further operates to pivot the upper edge of the plate into position onto the support, above the feed element.

9. The stacker of claim 7 which further includes a sensor for detecting the presence of a plate to be pivoted by the slide.

10. The stacker of claim 9 wherein the sensor detects the lower edge of the plate.

11. The stacker of claim 1 wherein the feed device further includes suspension clips for receiving a plate and for suspending the plate from an upper edge thereof.

* * * * *